(12) United States Patent
Lange et al.

(10) Patent No.: US 10,472,867 B2
(45) Date of Patent: Nov. 12, 2019

(54) SYSTEM AND METHOD FOR CONTROLLING A VEHICLE DOOR LOCK SYSTEM

(71) Applicant: GM GLOBAL TECHNOLOGY OPERATIONS LLC, Detroit, MI (US)

(72) Inventors: Richard J. Lange, Troy, MI (US); Jeffrey L. Konchan, Romeo, MI (US); Aaron P. Creguer, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 418 days.

(21) Appl. No.: 15/380,292

(22) Filed: Dec. 15, 2016

(65) Prior Publication Data

US 2018/0171683 A1    Jun. 21, 2018

(51) Int. Cl.
*E05B 81/76* (2014.01)
*E05B 77/12* (2014.01)
*E05B 77/30* (2014.01)
*B60R 25/10* (2013.01)

(52) U.S. Cl.
CPC .............. *E05B 81/76* (2013.01); *E05B 77/12* (2013.01); *E05B 77/30* (2013.01); *B60R 25/10* (2013.01)

(58) Field of Classification Search
CPC . E05B 7/12; E05B 81/16; E05B 77/54; E05B 81/56; E05B 81/64; E05B 81/76; E05B 81/80; B60R 25/24; B60R 25/252; B60R 25/32
See application file for complete search history.

(56) References Cited

U.S. PATENT DOCUMENTS

| | | | | |
|---|---|---|---|---|
| 5,850,174 | A * | 12/1998 | DiCroce | B60R 25/1001 340/426.28 |
| 6,567,012 | B1 * | 5/2003 | Matsubara | B60R 25/24 340/12.18 |
| 2016/0002959 | A1 * | 1/2016 | Javadzadeh | E05B 77/12 701/46 |
| 2019/0054896 | A1 * | 2/2019 | Watanabe | B60R 25/24 |

* cited by examiner

*Primary Examiner* — Van T Trieu
(74) *Attorney, Agent, or Firm* — Quinn IP Law (57) ABSTRACT

A system and method for controlling a door locking system includes a controller and at least one locking mechanism operatively connected to each of a plurality of doors. At least one lock switch connected to the controller selectively locks the at least one locking mechanism based at least partially on actuation of the at least one lock switch. At least one sensor array connected to the controller detects a vehicle condition from at least one of a first vehicle state and a second vehicle state.

17 Claims, 3 Drawing Sheets

SYSTEM AND METHOD FOR CONTROLLING A VEHICLE DOOR LOCK SYSTEM

INTRODUCTION

The present disclosure generally relates to a system and method for controlling a door locking system for a vehicle.

Latching systems of vehicles have undergone numerous changes over the years. Vehicle doors generally include a door latch to secure the door to the body of the vehicle, and a door lock system to engage and lock the door latch, and prevent the door from being opened from an exterior of the vehicle. When the door lock system is disposed in a locked state, the door may be opened from the interior of the vehicle by operating an interior door handle.

Some of the current latching systems have been redesigned with electronic switches to replace interior and exterior latch handle assemblies, which were previously formed of numerous mechanical parts. The electronic latching systems require control modules to ensure optimal usage. Some vehicles require that the interior door handle be actuated twice to open the door when the door lock system is disposed in the locked state.

For example, some vehicles require that the interior door handle be actuated a first time, which unlocks the door lock system, but does not unlatch the door latch. The interior door handle may then be actuated a second time to unlatch the door latch, and open the door.

SUMMARY

A door locking system for a vehicle having a vehicle body defining a vehicle interior and a plurality of doors configured to selectively open and close an entryway into the vehicle interior includes a door handle disposed on each of the plurality of doors and a locking mechanism operatively connected to the door handle and coupled to each of the plurality of doors. A controller is in communication with the locking mechanism and monitors at least one sensor array in communication with the controller to detect at least one of a first vehicle state and a second vehicle state. The locking mechanism releases one or more of the plurality of doors when the controller detects the second vehicle state and at least one of the door handle and locking mechanism is actuated.

The at least one sensor array may include an alarm sensor operatively connected to the controller and to a vehicle alarm system that is configured to detect a first vehicle state when the alarm system is disarmed and a second vehicle state when the alarm system is armed. The locking mechanism releases one or more of the plurality of doors when the controller detects the second vehicle state with the alarm sensor and at least one of the door handle and locking mechanism is actuated. The at least one sensor array may include an ignition sensor operatively connected to the controller and to a vehicle ignition that is configured to detect a vehicle state when the ignition is on and a second vehicle state when the ignition is off. The locking mechanism releases one or more of the plurality of doors when the controller detects the second vehicle state with the ignition sensor and at least one of the door handle and locking mechanism is actuated.

The at least one sensor array may include a transmission sensor operatively connected to the controller and to a vehicle transmission that is configured to detect a first vehicle state when the transmission is in gear and the second vehicle state when the transmission is in park. The locking mechanism releases one or more of the plurality of doors when the controller detects the second vehicle state with the transmission sensor and at least one of the door handle and locking mechanism is actuated. The at least one sensor array may include an airbag sensor operatively connected to the controller and an airbag that is configured to detect a first vehicle state when the airbag is stored and the second vehicle state when the airbag is deployed. The locking mechanism releases one or more of the plurality of doors when the controller detects the second vehicle state with the airbag sensor and at least one of the door handle and locking mechanism is actuated.

The locking mechanism releases one or more of the plurality of doors a predetermined amount of time after the controller detects the second vehicle state with the airbag sensor and at least one of the door handle and locking mechanism is actuated. The controller may provide an audio notification, a visual notification, or both, if it is determined that the controller detects the second vehicle state with the at least one sensory array and at least one of the door handle and locking mechanism is actuated. The controller may contact an authorized individual if it is determined that the at least one sensory array detects the second vehicle state and at least one of the door handle and locking mechanism is actuated.

In another embodiment of the disclosure, a method of controlling a door locking system for at least one door of a vehicle includes providing a door handle disposed on the at least one door and operatively connected to at least one locking mechanism and determining a locking state of at least one locking mechanism of the door locking system with a controller. A vehicle state is determined with at least one sensor array operatively connected to the controller to detect whether the vehicle is an at least one of a first vehicle state and a second vehicle state. An actuation state of the door handle and at least one locking mechanism may be determined to detect whether the at least one of the door handle and at least one locking mechanism are actuated. The at least one locking mechanism releases the at least one door when the at least one sensor array detects the second vehicle state and at least one of the door handle and locking mechanism is actuated.

The method may further include providing an alarm sensor operatively connected to the controller and to a vehicle alarm system that is configured to detect a first vehicle state when the alarm system is disarmed and a second vehicle state when the alarm system is armed and releasing the at least one door with the at least one locking mechanism when the alarm sensor detects the second vehicle state and at least one of the door handle and locking mechanism is actuated. The method may further include providing an ignition sensor operatively connected to the controller and to a vehicle ignition configured to detect a first vehicle state when the ignition is on and a second vehicle state when the ignition is off and releasing the at least one door with the at least one locking mechanism when the controller detects the second vehicle state with the ignition sensor and at least one of the door handle and locking mechanism is actuated.

The method may further include providing a transmission sensor operatively connected to the controller and to a vehicle transmission configured to detect a first vehicle state when the transmission is in gear and the second vehicle state when the transmission is in park and releasing the at least one door with the at least one locking mechanism when the controller detects the second vehicle state with the transmission sensor and at least one of the door handle and locking mechanism is actuated. The method may further include providing an airbag sensor operatively connected to the controller and an airbag configured to detect a first vehicle state when the airbag is stored and the second vehicle state when the airbag is deployed and releasing the at least one door with the at least one locking mechanism when the controller detects the second vehicle state with the airbag sensor and at least one of the door handle and locking mechanism is actuated. The method may further include restricting the release of the at least one door a predetermined amount of time after the controller detects the second vehicle state with the airbag sensor and at least one of the door handle and locking mechanism is actuated.

The above features and advantages and other features and advantages of the present disclosure are readily apparent from the following detailed description of the best modes for carrying out the disclosure when taken in connection with the accompanying drawings.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Figure 1:
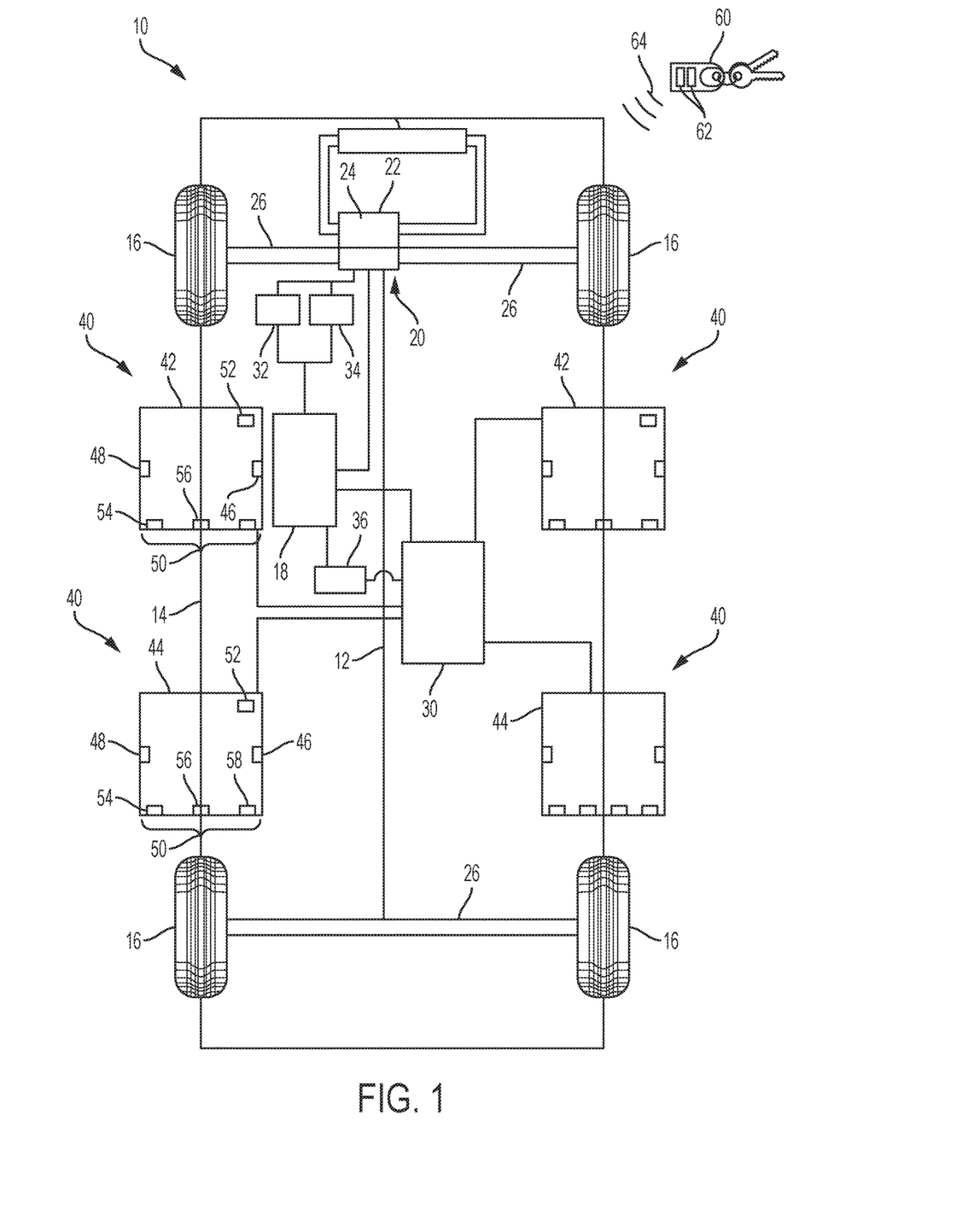
FIG. 1 is a functional block diagram of a vehicle that includes a control system for a door locking system of the vehicle in accordance with the present disclosure.

Referring to the drawings, wherein like reference numbers correspond to like or similar components throughout the several Figures, a vehicle 10 is shown schematically in FIG. 1. The vehicle 10 may be a mobile platform, including a motorized vehicle, such as, but not limited to, standard passenger cars, sport utility vehicles, light trucks, heavy duty vehicles, minivans, buses, transit vehicles, bicycles, robots, farm implements, sports-related equipment or other transportation device.

As described in greater detail further below, the vehicle 10 may include a door locking control system 30, also referred to herein as a control system 30, that provides for implementation of vehicle door engagement detection for at least one of a plurality of doors 40 of the vehicle 10. In one or more embodiments of the disclosure, the control system 30 provides appropriate notifications and/or takes appropriate actions when the control system 30 detects that an apparatus of a door 40 is operated from inside the vehicle 10 under certain circumstances and/or after a predetermined amount of time has elapsed after the circumstances are satisfied. An apparatus may include a handle, switch, actuator or the like that cooperates with and is operatively connected to one or more components of the door 40.

For example, a door 40 may be operated from inside the vehicle 10 when the vehicle 10 is parked, the door 40 is locked, and/or a vehicle alarm system 36 is set. It is understood that the apparatus of the door 40 may include, but not be limited to, an interior door handle 46, an exterior door handle 48, at least one locking mechanism 50 or the like. An interior door handle 46 may be considered to be operated from "inside" the vehicle 10 when it is operated from an interior portion or area of the vehicle passenger compartment of the vehicle 10 in which a driver or passenger may be positioned, for example, a front row of the vehicle 10, one or more rear rows of the vehicle 10, and/or a hatch or storage region behind the rear rows.

With reference to FIG. 1, vehicle 10 includes a chassis 12, a body 14, one or more wheels 16, an electronic control system 18, a steering system 32, a braking system 34, one or more doors 40 and the control system 30. The body 14 is arranged on the chassis 12 and substantially encloses the other components of the vehicle 10. The body 14 and the chassis 12 may jointly form a frame. The one or more wheels 16 are each rotationally coupled to the chassis 12 near a respective corner of the body 14.

Vehicle 10 may be provided in a variety of configurations. The vehicle 10 may also incorporate one of, or combination of, a number of different types of propulsion systems 22, such as, for example, a gasoline or diesel fueled combustion engine, a "flex fuel vehicle" (FFV) engine that uses a mixture of gasoline and ethanol or a similar combination), a gaseous compound, such as a hydrogen or natural gas fueled engine, a combustion/electric motor hybrid engine, and an electric motor.

A power generation assembly 20 includes at least one propulsion system 22 mounted on the chassis 12 and cooperates with a transmission to drive the one or more wheels 16. The power generation assembly 20 may include an engine 24. In one embodiment, the engine 24 may be an internal combustion engine. In other embodiments, the power generation assembly 20 may include one or more other types of engines and/or motors, such as an electric motor/generator, instead of or in addition to the internal combustion engine. The engine 24 is coupled to at least some of the wheels 16 to one or more drive shafts 26 through a transmission. In some embodiments, the engine 24 is mechanically coupled to the transmission. In other embodiments, the engine 24 may instead be coupled to a generator used to power an electric motor that is mechanically coupled to the transmission.

The steering system 32 of vehicle is mounted on the chassis 12, and controls steering of the wheels 16. The braking system 34 is mounted on the chassis 12, and provides braking for the vehicle 10. The control system 30 may also receive other inputs for various vehicle devices and/or systems, such as one or more vehicle radios, other entertainment systems, environmental control systems, lightning units, navigation systems, and the like (not shown).

Each of the plurality of doors 40 may be coupled to the body 14 of the vehicle 10, and may permit ingress and egress from a passenger compartment or vehicle interior defined by the body 14 of the vehicle 10. The doors 40 may include, but are not limited to, at least one front door 42 and at least one rear door 44 adjustably connected to the vehicle body 14. The doors 40 may be opened via one or more interior door handles 46 that may be disposed on an interior facing surface of the door 40 or one or more exterior door handles 48 disposed an exterior facing surface of the vehicle 10.

Each of the doors 40 may include at least one locking mechanism 50 in communication with the one or more interior door handles 46 and one or more exterior door handles 48. Each locking mechanism 50 may include a mechanical device or an electrical device that may be actuated or activated by at least one locking switch 54, suitable for releasably securing the door 40 to the body 14 to selectively open and close an entryway in the vehicle body 14 to the vehicle passenger compartment and/or power releasing the door 40 from securement adjacent the vehicle body 14 as will be described in greater detail below. The at least one locking mechanism 50 may include a power lock switch 54 that electrically locks and unlocks one or more of the doors 40 upon activation of door handle 46, 48 or other activation signal.

As is shown in FIG. 1, the at least one locking mechanism 50 may also include a manual lock switch 56 that may manually unlock one of the doors 40 upon activation. Further, the at least one locking mechanism 50 may include one or more lock switches 58 that may manually lock the doors 40. More specifically, the one or more lock switches 58 may include mechanical or electromechanical child door locks to prevent a child or other person in a rear seat or rear area of the passenger compartment of a vehicle from opening one or both rear doors from the passenger compartment. The controller 90 may be operatively connected to and selectively lock the at least one locking mechanism 50 based at least partially on actuation of one or more of the interior door handle 46, exterior door handle 48 and the at least one lock switch 54.

The at least one locking mechanism 50 may also include a latch 52 of a variety of styles or configurations. The latch 52 may be actuated by either an interior door handle 46, or an exterior door handle 48. In certain embodiments, the latch 52 may be coupled to or in communication with one or more of the lock switches 54, 56, and/or 58, and may be used by occupants inside the vehicle 10 to engage, actuate, activate and/or deactivate the one or more lock switches 54, 56, 58.

In one embodiment, latch 52 may have at least three operational states. In a first operational state, a locked state, the door 40 is secured by the latch 52 to secure or lock the door 40 relative to the body 14 in a closed position such that the exterior door handle 48 is disabled and will not open the door 40 while the interior door handle 46 may or may not be disabled. In a second operational state, an unlocked state, the door 40 is unlocked and may be opened by both door handles 46, 48 such that the door 40 is free to move between the closed position and an open position relative to the body 14. In a third operational state or child locked state, the interior door handle 46 may be disabled while the exterior door handle 48 is enabled such that the door 40 may be opened by the exterior door handle 48 but not by the interior door handle 46.

Control system 30 may interface with a remote system such as a wireless switch or remote keyless entry device fob 60 that allows a user to remotely lock or unlock the doors 40. In one example, the fob 60 may include one or more user input devices 62 and a transmitter 64. In the case of an "active" entry system, the user input devices 62 may be actuated by an operator to generate a signal to lock or unlock one or more of the doors 40 of the vehicle 10.

The signals generated by the actuation of the user input devices 62 may be transmitted by the transmitter 64 over a suitable wireless link to a receiver of the control system 30, such as a transceiver. Alternatively, in the case of a "passive" entry system, the transmitter 64 may transmit a signal to the receiver when the fob 60 has left a predetermined zone associated with the vehicle 10, such as, but not limited to, about 15 feet from the vehicle 10. The receiver may receive the signals from the transmitter 64 of the fob 60.

In one embodiment of the disclosure, a vehicle alarm system 36 may be coupled to the electronic control system 18 and/or the door locking control system 30 in various embodiments. The alarm system 36 may be configured to provide a notification when a third party attempts to enter a vehicle without authorization, such as without a proper key or fob. As will be described in greater detail below, the at least one sensor array 70 may include an alarm sensor operatively connected to the controller 90 and to the vehicle alarm system 36. The alarm sensor may be configured to detect a first vehicle state when the alarm system is disarmed and a second vehicle state when the alarm system is armed. The locking mechanism 50 may release one or more of the plurality of doors 40 when the alarm sensor detects the second vehicle state and at least one of the door handle and locking mechanism is actuated.

The alarm system 36 may provide audible notifications, such as a honking horn noise or other loud noises, and/or visual notifications, such as flashing lights. Additionally, the alarm system 36 may transmit notifications via a transceiver to a central server and/or security monitoring station when it is detected that a third party may be attempting to enter the vehicle 10 without authorization, such as when glass of a window or windshield of the vehicle 10 is broken and/or the vehicle 10 is otherwise tampered with while the alarm system 36 is turned on.

In one exemplary embodiment, the alarm system 36 is turned on a predetermined amount of time, for example, about 30 seconds, although the amount of time may vary in different embodiments, after each of the doors of the vehicle 10 are locked with the vehicle's ignition is turned off. In another exemplary embodiment, the alarm system 36 is turned on a predetermined amount of time, for example, about 30 seconds, although the amount of time may vary in different embodiments, after a vehicle user holding a fob 60 for the vehicle 10 has left the fob's transmission range with respect to the vehicle 10 with the vehicle's ignition turned off.

The door locking control system 30 may be disposed on the chassis 12. The control system 30 may provide appropriate notifications or actions that may help provide assistance when it detects that an apparatus, such as the interior door handle 46 or at least one locking mechanism 50 of one of the doors 40 is operated from inside the vehicle 10 under certain circumstances. Non-limiting examples of circumstances include when the vehicle 10 is parked, the vehicle 10 encounters energy from an external force, doors 40 are locked, an air bag deployment system is deployed, the vehicle alarm system 36 is set, and/or after a predetermined amount of time has elapsed after the circumstances are satisfied.

The notifications may provide assistance, for example, when one or more occupants have difficulty getting out of the vehicle 10. The control system 30 preferably performs these functions in accordance with the method 200 discussed further below. The control system 30 may include or be coupled to various other vehicle devices and systems, such as, among others, the power generation assembly 20, the electronic control system 18, and/or the doors 40.

Figure 2:
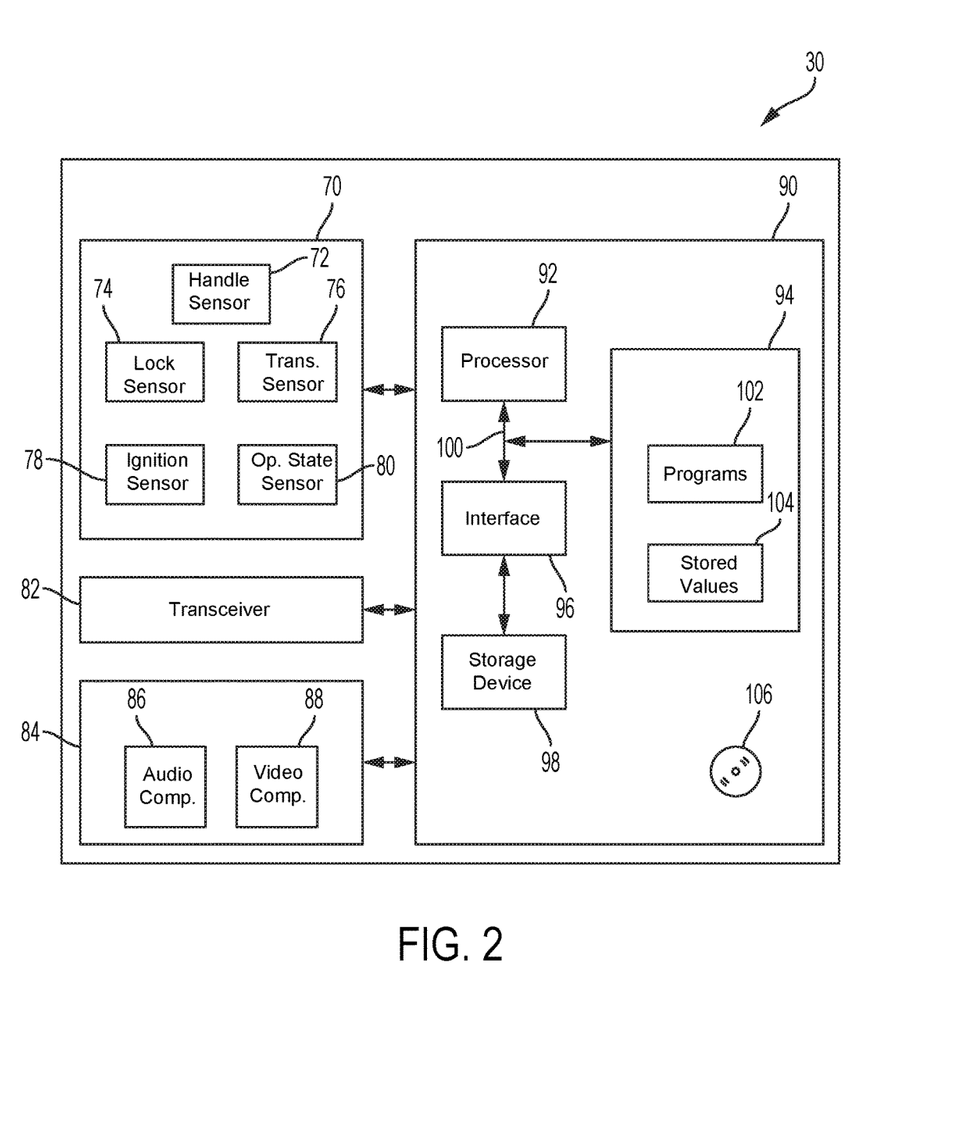
FIG. 2 is a functional block diagram of the door locking system that may be used in connection with the vehicle of FIG. 1.

Referring now to FIG. 2, a functional block diagram is provided for the door locking control system 30 of the vehicle illustrated in FIG. 1, in accordance with an exemplary embodiment. The control system 30 may include at least one sensor array 70, one or more transceivers 82, a notification unit 84, and a controller 90.

The at least one sensor array 70 may be operatively connected to the controller 90. The at least one sensor array 70 may be embodied as units within the controller 90 or separate from the controller 90. The at least one sensor array 70 may be configured to detect at least one of a first vehicle state and a second vehicle state. For example, the at least one sensor array 70 may detect a first vehicle state when the vehicle 10 is in a typical vehicle operating state and a second vehicle state when the vehicle 10 is in a non-typical vehicle operating state. One non-limiting exemplary non-typical state may be where the vehicle 10 encounters energy from an external force. The at least one sensor array 70 may further detect more than two vehicle operating states.

The at least one sensor array 70 may include a variety of sensors, including, but not limited to, one or more door handle sensors 72, one or more lock sensors 74, one or more transmission sensors 76, one or more ignition sensors 78 and one or more vehicle operating state sensors 80. Each door handle sensor 72 may detect whether an interior door handle 46 and/or an exterior handle 48 of a corresponding door 40 is operated from the interior or exterior of the vehicle 10. The one or more lock sensors 74 may detect whether the at least one locking mechanism 50 of the vehicle 10 has been actuated. In one embodiment of the disclosure, the lock sensors 74 detect whether one of the latch 52, power lock switches 54, manual lock switches 56, and/or child lock switches 58 are actuated from the interior of the vehicle 10.

The one or more transmission sensors 76 may be operatively connected to the controller 90 and to a vehicle transmission. The transmission may be in one of several operating states, such as park or in gear such as reverse, drive, neutral and low. The transmission sensors 76 may be configured to detect a first vehicle state when the transmission is in gear and a second vehicle state when the transmission is in park. The at least one locking mechanism 50 releases one or more of the plurality of doors 40 when the controller 90 detects the second vehicle state with the transmission sensor 76 and at least one of the door handle 46 and locking mechanism 50 is actuated.

The one or more ignition sensors 78 may be operatively connected to the controller 90 and to a vehicle ignition. The ignition sensors 78 may be configured to detect a first vehicle state when the ignition is on and a second vehicle state when the ignition is off. The at least one locking mechanism 50 releases one or more of the plurality of doors 40 when the controller 90 detects the second vehicle state with the ignition sensor 78 and at least one of the door handle 46 and locking mechanism 50 is actuated.

The one or more vehicle operating state sensors 80 may monitor at least one vehicle state. In one embodiment of the disclosure, operating state sensors 80 may include an airbag sensor that is operatively connected to the controller 90 and at least one airbag in the vehicle 10. The airbag sensor may configured to detect a first vehicle state when the airbag is stored or not deployed and a second vehicle state when the airbag is deployed. The at least one locking mechanism 50 releases one or more of the plurality of doors 40 when the controller 90 detects the second vehicle state with the airbag sensor 80 and at least one of the door handle 46 and locking mechanism 50 is actuated.

In another embodiment of the disclosure, the operating state sensors 80 may include a rollover sensor operatively connected to the controller 90 and wheels 16 of the vehicle 10. The rollover sensor may be configured to detect a first vehicle when the vehicle 10 is substantially un-rotated and the wheels 16 are on the ground. The rollover sensor may be configured to detect a second vehicle state to sense the angular position as well as the angular velocity or roll-rate of the vehicle 10.

In another embodiment of the disclosure, operating state sensors 80 may include a suspension sensor operatively connected to the controller 90 and wheels 16 of the vehicle 10. The suspension sensor may be configured to sense suspension deflection of the vehicle, that is, the vertical displacement and/or vertical velocity of the wheel 16 relative to the vehicle body/frame 14. The suspension sensor may be configured to detect a first vehicle state when the vehicle 10 is in a typical load state and a second vehicle state when the vehicle 10 is in a non-typical load state.

An onboard communication device or transceiver 82 communicates with devices of one or more users of the vehicle 10 and/or with one or more third parties, for example, via a central server. In one embodiment, the transceiver 82 communicates with the fob 60 of FIG. 1, for example, in receiving and implementing lock and unlock requests for the doors 40 and for determining whether the fob 60 is within a predetermined distance or range of the vehicle.

In certain embodiments, the transceiver 82 also provides notifications to a cellular telephone, smart phone, computer, tablet, and/or other device of the vehicle user when an apparatus pertaining to one of the doors 40 of the vehicle 10, such as the interior door handle 46 or at least one locking mechanism 50, is operated from inside the vehicle 10. In one non-limiting embodiment, transceiver 82 provides notifications when the interior door handle 46 or at least one locking mechanism 50 is actuated to detect that an occupant may be inadvertently left inside the vehicle while the user is away from the vehicle. The transceiver 82 may also provide such notifications to a third party, such as a central server, monitoring service, security service, law enforcement, fire department, and/or public service who may able to assist in such situations. The transceiver 82 may provide such notifications wirelessly, for example, via a short range wireless, cellular, satellite, and/or wireless network.

The notification unit 84 provides audio and/or visual notifications in proximity to the vehicle 10, such as within hearing distance and/or visual seeing distance from the vehicle 10. In one embodiment, the notification unit 84 provides audio and visual notifications via respective audio and visual components 86, 88 when an apparatus, such as the interior door handle 46 or the at least one locking mechanism 50, pertaining to one of the doors 40 of the vehicle 10 is operated from inside the vehicle 10. By way of example, the audio notifications provided via the audio component 86 may include a honking of a horn, an alarm-type sound, one or more other loud noises, and/or a verbal statement indicating that a person may be inside the vehicle 10. Also be way of example, the visual notifications provided via the visual component 88 may include flashing lights, strobe lights, and/or other visual indications to draw attention of the user and/or passersby to the vehicle 10.

The controller 90 may be coupled to the at least one sensor array 70, the transceiver 82, and the notification unit 84. In addition, in certain embodiments, the controller 90 is also coupled to one or more other vehicle systems, such as the electronic control system 18 of FIG. 1. The controller 90 receives the sensed information from the at least one sensor array 70, such as the engagement of door handles and/or locks, a gear or transmission state of the vehicle 10, and/or an operating state of the vehicle 10. In certain embodiments, the controller 90 also receives information from the transceiver 82, for example as to whether a user of the vehicle has left the vicinity of the vehicle.

Based upon this information, the controller 90 provides appropriate notifications under appropriate circumstances, such as when it is detected that an apparatus such as an interior door handle 46 or at least one locking mechanism 50 of one or more of the doors 40 is operated from inside the vehicle 10 under certain circumstances, including, but not limited to, when the vehicle 10 is parked, the doors 40 are locked, the vehicle encounters energy from an external force, the vehicle alarm system 36 is set, and/or after a predetermined amount of time has elapsed after the circumstances are satisfied. The controller 90 preferably performs these functions in accordance with the steps of the method 200 and discussed further below in connection therewith.

As depicted in FIG. 2, the controller 90 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and required input/output (I/O) circuitry, I/O devices, and communication interfaces, as well as signal conditioning and buffer electronics. In certain embodiments, the controller 90 may also include one or more of the at least one sensor array 70, transceiver(s) 82, notification unit 84, and/or one or more other systems. In addition, it will be appreciated that the controller 90 may otherwise differ from the embodiment depicted in FIG. 2. For example, the controller 90 may be coupled to or may otherwise utilize one or more remote computer systems and/or other control systems.

The computer system of the controller 90 may include a processor 92, a memory 94, an interface 96, a storage device 98, and a bus 100. The processor 92 performs the computation and control functions of the controller 90, and may include a processor or multiple processors, single integrated circuits such as a microprocessor, or a number of integrated circuit devices and/or circuit boards working in cooperation to accomplish the functions of a processing unit. During operation, the processor 92 executes one or more programs 102 contained within the memory 94 and, as such, controls the general operation of the controller 90 and the computer system of the controller 90, preferably in executing the steps of the methods described herein, such as the steps of the method 200 and sub-processes thereof.

The memory 94 may be a type of suitable memory. The computer-readable memory may include a non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

In certain examples, the memory 94 is located on and/or co-located on the same computer chip as the processor 92. In the depicted embodiment, the memory 94 stores the above-referenced program 102 along with one or more stored values 104 for use in making the determinations. In one such embodiment, the stored values 104 are thresholds used for various determinations of the method 200, such as the amount of time after an alarm is set before an action is taken.

The bus 100 serves to transmit programs, data, status and other information or signals between the various components of the computer system of the controller 90. The interface 96 allows communication to the computer system of the controller 90, for example from a system driver and/or another computer system, and may be implemented using a method or apparatus. It may include one or more network interfaces to communicate with other systems or components. The interface 96 may also include one or more network interfaces to communicate with technicians, and/or one or more storage interfaces to connect to storage apparatuses, such as the storage device 98.

The storage device 98 may be a storage apparatus, including direct access storage devices such as hard disk drives, flash systems, floppy disk drives and optical disk drives. In one exemplary embodiment, the storage device 98 may be a program product from which memory 94 may receive a program 102 that executes one or more embodiments of one or more methods of the present disclosure, such as the steps of the method 200 described further below. In another exemplary embodiment, the program product may be directly stored in and/or otherwise accessed by the memory 94 and/or a disk, as represented by numeral 106, such as that referenced below.

The bus 100 may be a physical or logical component for connecting computer systems and components. This includes, but is not limited to, direct hard-wired connections, fiber optics, infrared and wireless bus technologies. During operation, the program 102 is stored in the memory 94 and executed by the processor 92.

It will be appreciated that while this exemplary embodiment is described in the context of a fully functioning computer system. The mechanisms are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor, such as the processor 92, to perform and execute the program.

Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 90 may also otherwise differ from the embodiment depicted in FIG. 2, for example in that the computer system of the controller 90 may be coupled to or may otherwise utilize one or more remote computer systems and/or other control systems.

Figure 3:
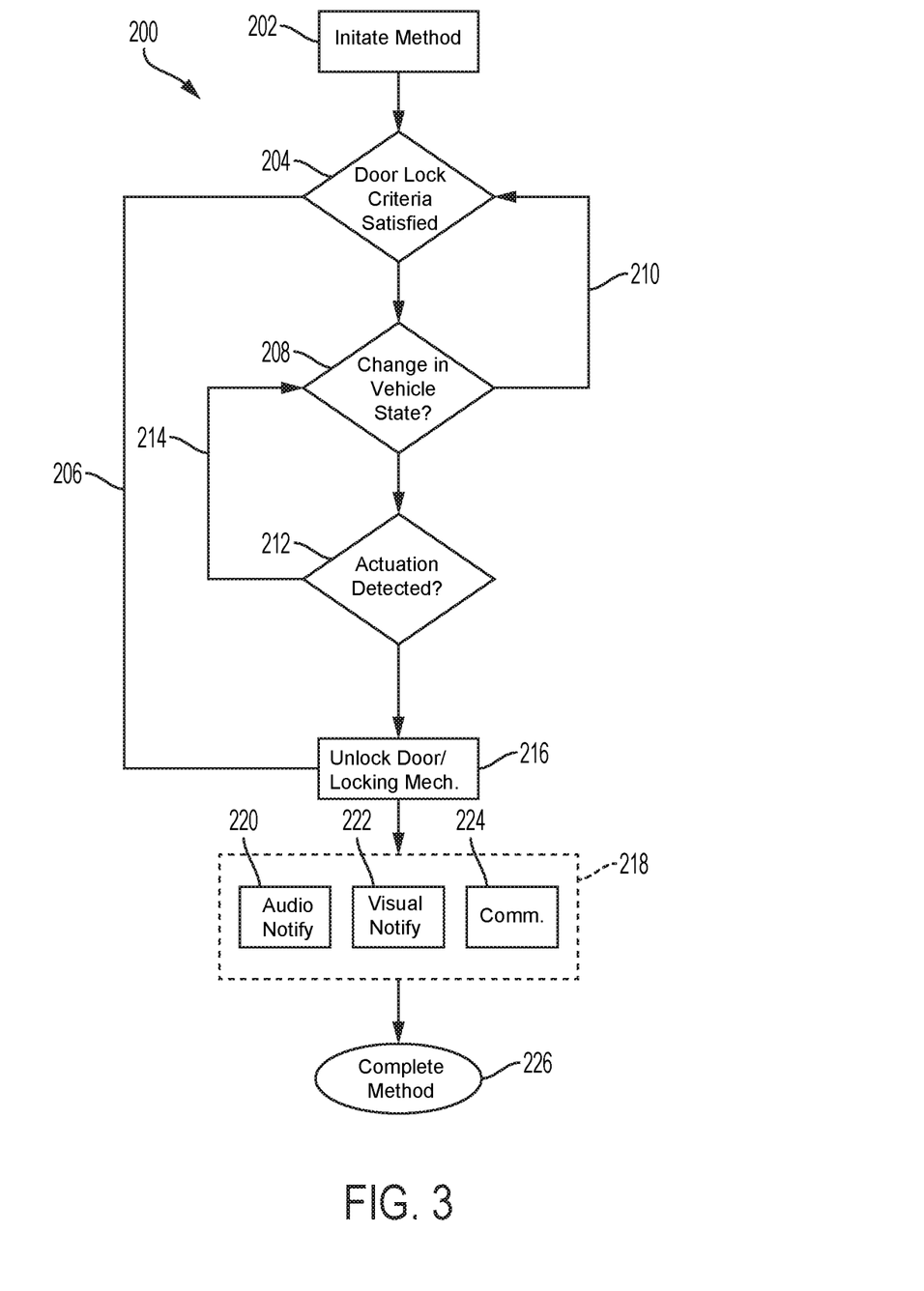
FIG. 3 is a flowchart of a method for controlling a vehicle door locking system in accordance with the present disclosure.

Referring to FIG. 3, a method of controlling the door locking control system 30 of a vehicle 10 is generally described. The method is generally referenced by numeral 200. It is understood that the teachings of method 200 may be described herein in terms of functional and/or logical block or box components and/or various processing steps. It should be realized that such block or box components may include one or more hardware, software, and/or firmware components configured to perform the specified functions.

The method may initiate at box 202, wherein a door handle is disposed on the at least one door and operatively connected to at least one locking mechanism and determining a locking state of at least one locking mechanism of the door locking system with a controller. At box 204, the door locking control system 30 senses and evaluates whether door lock power release criteria are active or satisfied. For example, the door lock power release criteria may include determining the current state or status of the at least one locking mechanism 50 with the controller 90. The current status of the at least one locking mechanism 50 is sensed to determine if the at least one locking mechanism 50 is disposed in a locked state, or is disposed in an unlocked state.

The controller 90 may sense the status of the at least one locking mechanism 50. For example, the vehicle 10 controller may sense and/or determine the status of the at least one locking mechanism 50 based on data received from one or more of the latch and/or the at least one lock switch 54. However, it should be appreciated that the controller 90 may use some other sensor capable sensing the position and/or status of the at least one locking mechanism 50 to determine the current status of the at least one locking mechanism 50.

If the controller 90 determines that the door lock power release criteria of the control system 30 is satisfied, then the controller 90 instructs the at least one locking mechanism 50 to change from a locked state to an unlocked state as generally shown by reference numeral 206 to power release the door. If the door lock power release criteria is not met, then the process proceeds to box 208.

At box 208, the controller 90, operatively connected to the at least one sensor array 70, utilizes the at least one sensor array 70 to determine at least one vehicle state. The at least one sensor array 70 and controller 90 may monitor one or more vehicle parameters to identify a change in a vehicle state between at least one of a first vehicle state and a second vehicle state. The at least one sensor array 70 may also detect an adjustment of the vehicle between the first vehicle state and the second vehicle state.

For example, the at least one sensor array 70 and controller 90 may detect the vehicle 10 in the second vehicle state. Some non-limiting examples of a vehicle state change may be identified from the group consisting of activation of an alarm system 36 of the vehicle 10, deployment of air bags or other safety systems of the vehicle 10, the vehicle 10 encounters energy from an external force and/or that a predetermined amount of time elapses from the initial detection of one or more of the changes in the vehicle state.

For example, controller 90 may analyze a predetermined amount of time, for example, about 15 seconds, although the amount of time may vary in different embodiments, after the at least one sensor array 70 detects that the vehicle 10 encounters energy from an external force or from deployment of the air bag system, to ensure a change in the vehicle state results from the encounter. Alternatively, the at least one sensor array 70 and controller 90 may detect the vehicle in the first vehicle state wherein the vehicle may be in an inactive state, while the second vehicle state may be the vehicle in an active or operational state.

The controller 90 may also determine whether an alarm system 36 is set, for example as may be transmitted to the controller 90 by the one or more transceivers 82 and/or by a vehicle bus 100, and/or as detected by one or more other, non-depicted sensors of the at least one sensor array 70. The various measurements and/or other data are preferably provided from the respective sources to the controller 90 for evaluation.

If the controller 90 does not detect a change in the vehicle state, the process returns to box 204 as represented by line 210 to evaluate whether the door lock power release criteria are met. If the at least one sensor array 70 and/or controller 90 detect a change in the vehicle state from the first vehicle state to the second vehicle state, the process proceeds to box 212.

At box 212, the at least one sensor array 70 and controller 90 monitors the at least one locking mechanism 50 to detect actuation of one or more of the at least one lock switch 54, movement of the interior door handle 46 and/or a change in the locking state of the at least one locking mechanism 50 to an actuated state. It is contemplated that the actuated state may include adjustment of the at least one locking mechanism 50 without instruction from the controller 90.

In one embodiment of the disclosure, the at least one sensor array 70 and/or controller 90 may measure values from the one or more handle sensors 72 as to whether an interior door handle 46 has been operated from the passenger compartment of the vehicle 10, measure values from the transmission sensors 76 as to a gear or transmission state of the vehicle 10, and/or measure values from the one or more door ignition sensors 76 as to whether the ignition of the vehicle 10 is active.

Movement of the interior door handle 46 may be monitored to determine if an occupant of the passenger compartment of the vehicle 10 is attempting to open the door 40 of the vehicle 10 from within the passenger compartment. The controller 90 may sense movement of the interior door handle 46. For example, the controller 90 may sense and/or determine movement of the interior door handle 46 based on data received from a sensing device such as the at least one lock switch 54. Alternatively, the sensing device may include a sensing switch directly coupled to the interior door handle 46. However, it should be appreciated that the controller 90 may use some other sensor capable sensing movement of the interior door handle 46.

If the controller 90 does not sense actuation of the at least one lock switch 54 and/or detect movement of the interior door handle 46, then the process returns to box 208 to determine whether a change in the vehicle state exists as represented by line and reference numeral 214. If the controller 90 senses actuation or a change of actuation state in the at least one lock switch 54 and/or movement of the interior door handle 46, the controller 90 moves to box 216.

In one embodiment, the method may further include providing an alarm sensor operatively connected to the controller 90 and to a vehicle alarm system 36 that is configured to detect a first vehicle state when the alarm system 36 is disarmed and a second vehicle state when the alarm system 36 is armed and releasing the at least one door 40 with the at least one locking mechanism 50 when the alarm sensor detects the second vehicle state and at least one of the door handle 40 and locking mechanism 50 is actuated. In another embodiment, the method may further include providing an ignition sensor operatively connected to the controller 90 and to a vehicle ignition configured to detect the a vehicle state when the ignition is on and a second vehicle state when the ignition is off and releasing the at least one door 40 with the at least one locking mechanism 50 when the ignition sensor detects the second vehicle state and at least one of the door handle 46 and locking mechanism 50 is actuated.

In yet another embodiment, the method may further include providing a transmission sensor operatively connected to the controller 90 and to a vehicle transmission configured to detect a first vehicle state when the transmission is in gear and the second vehicle state when the transmission is in park and releasing the at least one door 40 with the at least one locking mechanism 50 when the transmission sensor detects the second vehicle state and at least one of the door handle 46 and locking mechanism 50 is actuated. In another embodiment, the method may further include providing an airbag sensor operatively connected to the controller 90 and an airbag configured to detect a first vehicle state when the airbag is stored and the second vehicle state when the airbag is deployed and releasing the at least one door 40 with the at least one locking mechanism 50 when the airbag sensor detects the second vehicle state and at least one of the door handle 46 and locking mechanism 50 is actuated. The release of the at least one door 40 may be restricted or delayed a predetermined amount of time after the airbag sensor detects the second vehicle state and at least one of the door handle 46 and locking mechanism 50 is actuated.

At box 216, the controller 90 may instruct the at least one locking mechanism 50 to power release and/or open one or more doors 40 of the vehicle 10. In one such embodiment, the at least one locking mechanism 50 each of the doors 40 are unlocked. In certain of these embodiments, the at least one locking mechanism 50 opens at least one door 40 or each of the doors 40 by power releasing the doors 40 from adjacent the vehicle body 14. In certain other embodiments, certain of the at least one lock switches 54 may be unlocked while other lock switches 54 may remain locked. The at least one locking mechanism 40 releases the at least one door 40 when the at least one sensor array 70 detects the second vehicle state and at least one of the door handle 46 and locking mechanism 50 is actuated.

In addition, in certain embodiments, at least one locking mechanism 50 for one or more of the doors 40 may be unlocked and may be opened. For example, in certain embodiments an interior door handle 46 and/or exterior door handle 48 is unlocked and/or operated, while in other embodiments additional doors 40 may be unlocked and/or remain closed.

The method 200 may include a process represented by box 218 wherein the controller 90, in response to detection of the vehicle state and disabling the at least one locking mechanism 50 with the controller 90 when the at least one lock switch 54 is in the second actuated state and the at least one sensor array 70 detects the second vehicle state, transmits a notification. The notification may be provided in a variety of non-limiting forms, including an audio notification, a visual notification and/or contacting an authorized individual through a wireless transmitter, cellular device and the like.

For example, at box 220, an audio notification is provided. The audio notification is preferably provided via instructions provided by the processor 92 of controller 90 to the audio component 86 of the notification unit 84. In one embodiment, the audio notifications provided via the audio component 86 may include a honking of a horn, an alarm-type sound, one or more other loud noises, and/or a verbal statement indicating that a person may be inside the vehicle 10.

Box 222 represents display of a visual notification. The visual notification is preferably provided via instructions provided by the processor 92 of controller 90 to the visual component 88 of the notification unit 84. In one embodiment, the visual notifications provided via the visual component 88 may include flashing lights, strobe lights, and/or other audio indications to draw attention of the user and/or passersby to the vehicle 10.

Box 224 represents communication provided to a user of the vehicle or a third party other than the user of the vehicle 10. In one embodiment, the communication is provided to a driver, owner, and/or other user of the vehicle via instructions provided by the processor 92 of the controller 90 to the transceiver 82 to transmit a telephone call, text message, e-mail, and/or one or more other messages and/or other notifications to the user's cellular telephone, smart phone, computer, tablet, and/or other device of the vehicle user, for example, via a short range wireless, cellular, satellite, and/or wireless network, informing the user that an engagement of a vehicle door 40 has been operated and/or that an individual may be inside the vehicle 10.

In another embodiment of the disclosure, the communication is provided to a third party, such as a central server, monitoring service, security service, law enforcement, fire department, and/or public service who may able to assist, via instructions provided by the processor 92 of the controller 90 to the transceiver 82 to transmit a telephone call, text message, e-mail, and/or one or more other messages and/or other notifications for example, via a short range wireless, cellular, satellite, and/or wireless network, to such third party informing the third party that an engagement of a vehicle door 40 has been operated and/or that an individual may be inside the vehicle 10. The third party may then contact the user and/or initiate appropriate actions to facilitate assistance with the situation.

Method 200 may be completed by the controller 90 as generally detected by 226. It is within the scope of the present disclosure that the controller 90 employed may eliminate one or more steps or entry conditions or may determine the steps in an order other than as described above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A door locking system for a vehicle having a vehicle body defining a vehicle interior and a plurality of doors configured to selectively open and close at least one entryway into the vehicle interior, the door locking system comprising:
   a door handle disposed on each of the plurality of doors;
   a locking mechanism operatively connected to the door handle and coupled to each of the plurality of doors;
   a controller in communication with the locking mechanism;
   an alarm sensor operatively connected to the controller and to a vehicle alarm system, wherein the alarm sensor detects a first vehicle state when the alarm system is disarmed and detects a second vehicle state when the alarm system is armed; and wherein the locking mechanism releases one or more of the plurality of doors when the controller detects the alarm system is armed in the second vehicle state with the alarm sensor and at least one of the door handle and locking mechanism is actuated.

2. The door locking system of claim 1 further comprising:
an ignition sensor operatively connected to the controller and to a vehicle ignition, wherein the ignition sensor detects a first vehicle state when the ignition is on and a second vehicle state when the ignition is off; and
wherein the locking mechanism releases one or more of the plurality of doors when the controller detects the ignition is off in the second vehicle state with the ignition sensor, the alarm system is armed in the second vehicle state and at least one of the door handle and locking mechanism is actuated.

3. The door locking system of claim 2 wherein the alarm system is armed in the second state at a predetermined amount of time after the controller detects each of the doors of the vehicle are locked and the ignition sensor detects the vehicle ignition is turned off in the second state.

4. The door locking system of claim 2 further comprising a remote keyless entry device fob cooperating with the at least one locking mechanism, wherein the alarm system is armed in the second state at a predetermined amount of time after the controller detects the remotely keyless device fob exits a predetermined zone associate with the vehicle and the ignition sensor detects the vehicle ignition is turned off in the second state.

5. The door locking system of claim 1 further comprising:
a transmission sensor operatively connected to the controller and to a vehicle transmission, wherein the transmission sensor detects a first vehicle state when the transmission is in gear and the second vehicle state when the transmission is in park; and
wherein the locking mechanism releases one or more of the plurality of doors when the controller detects the transmission is in park in the second vehicle state with the transmission sensor, the alarm system is armed in the second vehicle state and at least one of the door handle and locking mechanism is actuated.

6. The door locking system of claim 1 wherein the controller provides an audio notification, a visual notification, or both, if it is determined that the controller detects the second vehicle state with the at least one alarm sensor and at least one of the door handle and locking mechanism is actuated.

7. The door locking system of claim 1 wherein the controller contacts an authorized individual if it is determined that the at least one alarm sensor detects the second vehicle state and at least one of the door handle and locking mechanism is actuated.

8. A vehicle comprising:
a chassis;
one or more wheels rotationally coupled to the chassis:
a vehicle body arranged on the chassis, the vehicle body defining at least one entryway into a vehicle interior;
a plurality of doors adjustably connected to the vehicle body configured to selectively open and close the entryway into the vehicle interior; and
a door locking system having:
a door handle disposed on each of the plurality of doors;
a locking mechanism operatively connected to the door handle and coupled to each of the plurality of doors;
a controller in communication with the locking mechanism; and an alarm sensor operatively connected to the controller and to a vehicle alarm system, wherein the alarm sensor detects the first vehicle state when the alarm system is disarmed and detects the second vehicle state when the alarm system is armed; and
wherein the locking mechanism releases one or more of the plurality of doors when the controller detects the alarm system is armed in second vehicle state with the alarm sensor and at least one of the door handle and locking mechanism is actuated.

9. The vehicle of claim 8 further comprising:
an ignition sensor operatively connected to the controller and to a vehicle ignition, wherein the ignition sensor detects a first vehicle state when the ignition is on and a second vehicle state when the ignition is off; and
wherein the locking mechanism releases one or more of the plurality of doors when the controller detects the ignition is off in the second vehicle state with the ignition sensor and at least one of the door handle and locking mechanism is actuated.

10. The vehicle of claim 9 wherein the alarm system is armed in the second state at a predetermined amount of time after the controller detects each of the doors of the vehicle are locked and the ignition sensor detects the vehicle ignition is turned off in the second state.

11. The vehicle of claim 9 further comprising a remote keyless entry device fob cooperating with the at least one locking mechanism, wherein the alarm system is armed in the second state at a predetermined amount of time after the controller detects the remotely keyless device fob exits a predetermined zone associate with the vehicle and the ignition sensor detects the vehicle ignition is turned off in the second state.

12. The vehicle of claim 8 further comprising:
a transmission sensor operatively connected to the controller and to a vehicle transmission, wherein the transmission sensor detects a first vehicle state when the transmission is in gear and the second vehicle state when the transmission is in park; and
wherein the locking mechanism releases one or more of the plurality of doors when the controller detects the transmission is in park in the second vehicle state with the transmission sensor and at least one of the door handle and locking mechanism is actuated.

13. The vehicle of claim 8 further comprising:
at least one operating state sensor operatively connected to the controller to detect angular position and angular velocity of the vehicle, wherein the at least one operating state sensor detects the first vehicle state when the vehicle is substantially un-rotated and one or more wheels of the vehicle are positioned on a ground surface and the second vehicle state when the at least one operating sensor detects a change in angular position and angular velocity of the vehicle,
wherein the locking mechanism releases one or more of the plurality of doors when the controller detects the vehicle is in the second vehicle state with the at least one operating state sensor and at least one of the door handle and locking mechanism is actuated.

14. The vehicle of claim 8 further comprising:
at least one operating state sensor operatively connected to the controller to detect vehicle suspension deflection in the one or more wheels of the vehicle, wherein the at least one operating state sensor detects a change between the first vehicle state and the second vehicle state when the at least one operating sensor detects a change in vertical displacement and vertical velocity in the one or more wheels of the vehicle, wherein the locking mechanism releases one or more of the plurality of doors when the controller detects the vehicle is in the second vehicle state with the at least one operating state sensor and at least one of the door handle and locking mechanism is actuated.

15. A method of controlling a door locking system for at least one door of a vehicle comprising:
providing a door handle disposed on the at least one door and operatively connected to at least one locking mechanism;
determining a locking state of at least one locking mechanism of the door locking system with a controller;
providing an alarm sensor operatively connected to the controller and to a vehicle alarm system;
determining vehicle state with the alarm sensor to detect whether the vehicle is in at least one of a first vehicle state and a second vehicle state, wherein the alarm sensor detects a first vehicle state when the alarm system is disarmed and detects a second vehicle state when the alarm system is armed;
determining an actuation state of the door handle and at least one locking mechanism to detect whether the at least one of the door handle and at least one locking mechanism are actuated; and
releasing the at least one door with the at least one locking mechanism when the alarm sensor detects the second vehicle state and at least one of the door handle and locking mechanism is actuated.

16. The method of claim 15 further comprising:
providing an ignition sensor operatively connected to the controller and to a vehicle ignition, wherein the ignition sensor detects a first vehicle state when the ignition is on and a second vehicle state when the ignition is off; and
releasing the at least one door with the at least one locking mechanism when the controller detects the second vehicle state with the ignition sensor and at least one of the door handle and locking mechanism is actuated.

17. The method of claim 15 further comprising:
providing a transmission sensor operatively connected to the controller and to a vehicle transmission, wherein the transmission sensor detects a first vehicle state when the transmission is in gear and the second vehicle state when the transmission is in park; and
releasing the at least one door with the at least one locking mechanism when the controller detects the second vehicle state with the transmission sensor and at least one of the door handle and locking mechanism is actuated.

* * * * *